(12) United States Patent
Johnson

(10) Patent No.: US 6,909,460 B2
(45) Date of Patent: Jun. 21, 2005

(54) MEDIAN-BASED DARK LEVEL ACQUISITION FOR A FRAME RATE CLAMP

(75) Inventor: Bruce V. Johnson, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 897 days.

(21) Appl. No.: 09/915,015

(22) Filed: Jul. 25, 2001

(65) Prior Publication Data

US 2003/0020818 A1 Jan. 30, 2003

(51) Int. Cl.[7] .................................................. H04N 9/64
(52) U.S. Cl. ....................................................... 348/243
(58) Field of Search ................................. 348/243, 241, 348/244

(56) References Cited

U.S. PATENT DOCUMENTS

| | | | | |
|---|---|---|---|---|
| 4,962,425 A | * | 10/1990 | Rea | 348/187 |
| 4,975,864 A | * | 12/1990 | Sendall et al. | 382/275 |
| 5,028,849 A | * | 7/1991 | Kawakami et al. | 315/368.11 |
| 5,086,343 A | * | 2/1992 | Cook et al. | 348/247 |
| 5,592,164 A | * | 1/1997 | Hilbert et al. | 341/120 |
| 5,659,355 A | * | 8/1997 | Barron et al. | 348/245 |
| 6,445,413 B1 | * | 9/2002 | Hosier et al. | 348/245 |
| 6,539,125 B1 | * | 3/2003 | Harrington | 382/262 |
| 6,774,941 B1 | * | 8/2004 | Boisvert et al. | 348/241 |
| 6,829,007 B1 | * | 12/2004 | Bilhan et al. | 348/243 |
| 6,839,085 B1 | * | 1/2005 | Matsukawa | 348/243 |
| 2002/0033764 A1 | | 3/2002 | Graen | 341/155 |

FOREIGN PATENT DOCUMENTS

| | | | | |
|---|---|---|---|---|
| EP | 0 809 370 A1 | 11/1997 | | H04B/10/158 |
| JP | 06164988 | 6/1994 | | H04N/5/18 |

* cited by examiner

Primary Examiner—Wendy R. Garber
Assistant Examiner—Jacqueline Wilson
(74) Attorney, Agent, or Firm—Peyton C. Watkins

(57) ABSTRACT

A circuit for determining the median dark level of an image sensor, the circuit comprises a first circuit for comparing a current pixel value and a cumulative median; a storage element for storing the cumulative median level; and a second circuit which utilizes the first circuit for adjusting the cumulative median based on the current pixel level input for updating the cumulative median dark level.

10 Claims, 3 Drawing Sheets

MEDIAN-BASED DARK LEVEL ACQUISITION FOR A FRAME RATE CLAMP

FIELD OF THE INVENTION

The present invention relates to dark level acquisition for image sensors and, more particularly, to acquiring a median dark level for such image sensors.

BACKGROUND OF THE INVENTION

As is well known to those skilled in the art, image sensors have a pre-determined portion of pixels specifically designated for acquiring a dark level signal representing the sensitivity of the pixels to darkness. This signal is subsequently used in calibrating the actual signals representing an image. Typically, such sensors use the average value of the designated portion of pixels. However, the average dark level output of pixels in active pixel sensors may vary considerably, depending on process variations, temperature, and the like. In this regard, the active pixel sensor typically includes a pixel array, analog-processing circuits, and an analog-to-digital (A-to-D) converter. To maximize the useful signal swing at the input of the A-to-D converter, a frame rate clamp is typically used to develop an average dark level over a large number of dark pixels, which is subtracted from the pixel output signals during frame read operations.

Although the currently known and utilized circuitry for acquiring dark level signals is satisfactory, they include drawbacks. Using the average value for the dark level subjects the sensor calibration to the extreme values of defective pixels and the like. Consequently, a need exists for a median pixel value for dark level acquisition, which overcomes the above drawbacks.

SUMMARY OF THE INVENTION

The present invention is directed to overcoming one or more of the problems set forth above. Briefly summarized, according to one aspect of the present invention, the invention resides in a circuit for determining median dark level of an image sensor, the circuit comprises (a) a first circuit for comparing a current pixel value and a cumulative median; (b) a storage element for storing the cumulative median level, and (c) a second circuit which utilizes the first circuit for adjusting the cumulative median based on the current pixel level input for updating the cumulative median dark level.

These and other aspects, objects, features and advantages of the present invention will be more clearly understood and appreciated from a review of the following detailed description of the preferred embodiments and appended claims, and by reference to the accompanying drawings.
Advantageous Effect of the Invention The present invention develops a median dark level, which will be more accurate than an average dark level in the presence of defective pixels. Defective pixels may have extreme values that could significantly distort a mathematical average of the pixels, however these extreme values will have less effect in a median calculation.

The present invention has the advantage of using a comparator as the key analog component, which can be implemented in CMOS to achieve relatively high speed and accuracy. In contrast, circuits using an analog averaging approach would require high performance linear amplifiers, which are more difficult to implement. Errors due to offsets and settling time issues in linear amplifiers would be eliminated by the present invention.

In addition, the circuitry of the present invention for the median dark level acquisition requires minimal supervisory control. An on-chip microprocessor controller would not be required, which is an advantage for a standalone CMOS imager.

DETAILED DESCRIPTION OF THE INVENTION

Figure 1:
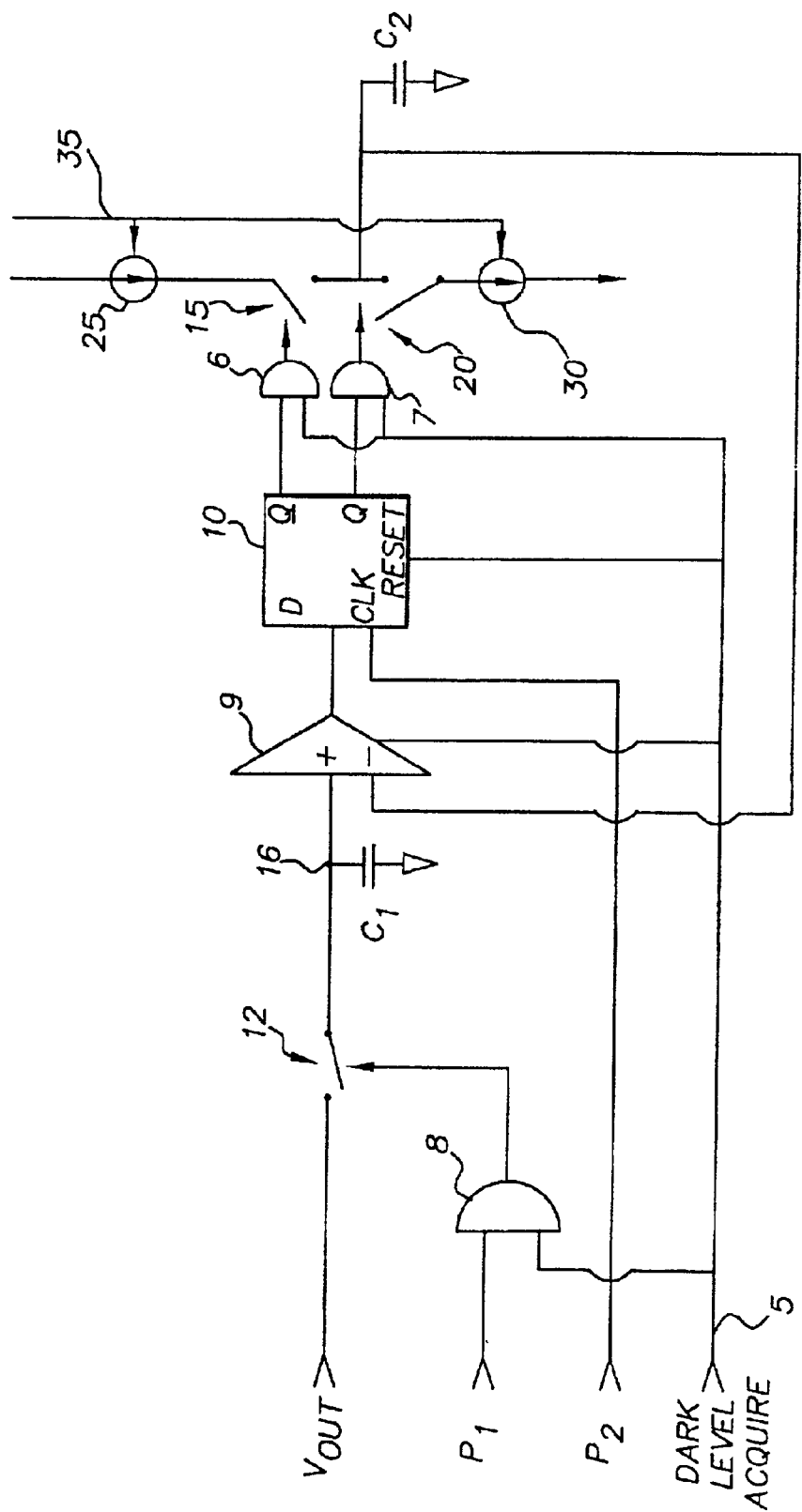
FIG. 1 is a schematic diagram of the analog implementation of the dark level acquisition circuitry of the present invention.
Figure 2:
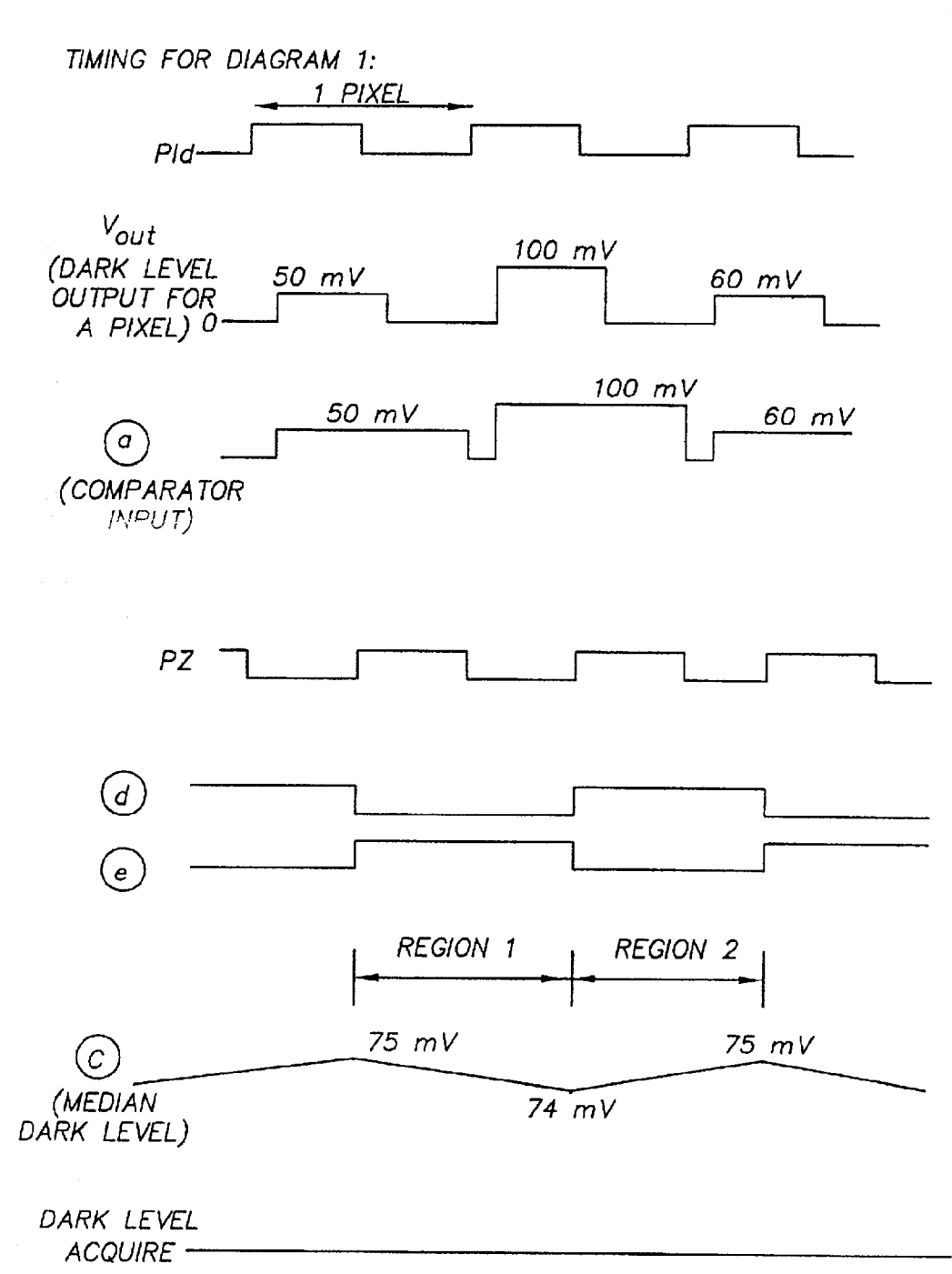
FIG. 2 is a timing diagram of FIG. 1.

Referring to FIGS. 1 and 2, there is shown a circuit for obtaining the median level signal for dark level acquisition in FIG. 1 and its corresponding timing diagram in FIG. 2. In this regard, the dark level acquire input 5 is turned to a high state for initiation of the acquisition of the dark level signal by enabling AND gates 6, 7 and 8, comparator 9, and D flip-flop 10. $P_1$ is the pixel-rate clock and $P_2$ is an inverted version of the pixel-rate clock. When $P_1$ goes high, a pixel dark level voltage from one of the pre-determined pixels (not shown) designed for dark-level acquisition is read at $V_{out}$, passed through analog switch 12, and stored at junction 15 of the pixel signal storage capacitor $C_1$. Comparator 9 compares the pixel dark level voltage stored at $C_1$ to the cumulative median dark level voltage stored at $C_2$. If the pixel dark level voltage at $C_1$ is greater than the cumulative median at $C_2$, the comparator outputs a logic high (positive result); if the pixel dark level voltage is less then the cumulative median, the comparator outputs a logic low (negative result). When $P_1$ goes low, the comparator output will be stable. At this point $P_2$ goes high and clocks the comparator result to the output of the D flip-flop 10.

A positive result (Q output high) activates analog switch 15 to add charge to $C_2$ to increase the cumulative median voltage. A negative result (Q output low) activates analog switch 20 to decrease the cumulative median voltage. For example, if the pixel dark level is lower than the cumulative median dark level, the Qbar output from the D flip-flop 10 goes high and, via AND gate 7, causes the current source 30 to drain current from $C_2$ which decreases the median dark level (region 1). If the pixel dark level is higher than the median dark level, the Q output from D Flip-flop 10 goes high and, via AND gate 6, causes current source 25 to add current to $C_2$, which increases the median dark level (region 2). This process is repeated for each pixel sampled in the dark level acquire mode, i.e. when input 5 is high. Each comparison result adds or subtracts a fixed increment of charge at $C_2$, the amount of charge being determined by the current in the current sources (25 and 30) and the pixel time period.

After acquiring all dark pixel values, the dark level acquire 5 is turned low so that the acquiring process is terminated. The median value of the dark level pixels is then used for calibrating subsequent pixel values for the image captured by the sensor (not shown).

It is instructive to note that a fine/coarse adjustment 35 is connected to both current sources 25 and 30 for adjusting the degree of current supplied by the current sources. This provides for either a quick determination of the median value (coarse) or an adjustment having finer increments for a more accurate median value.

Figure 3:
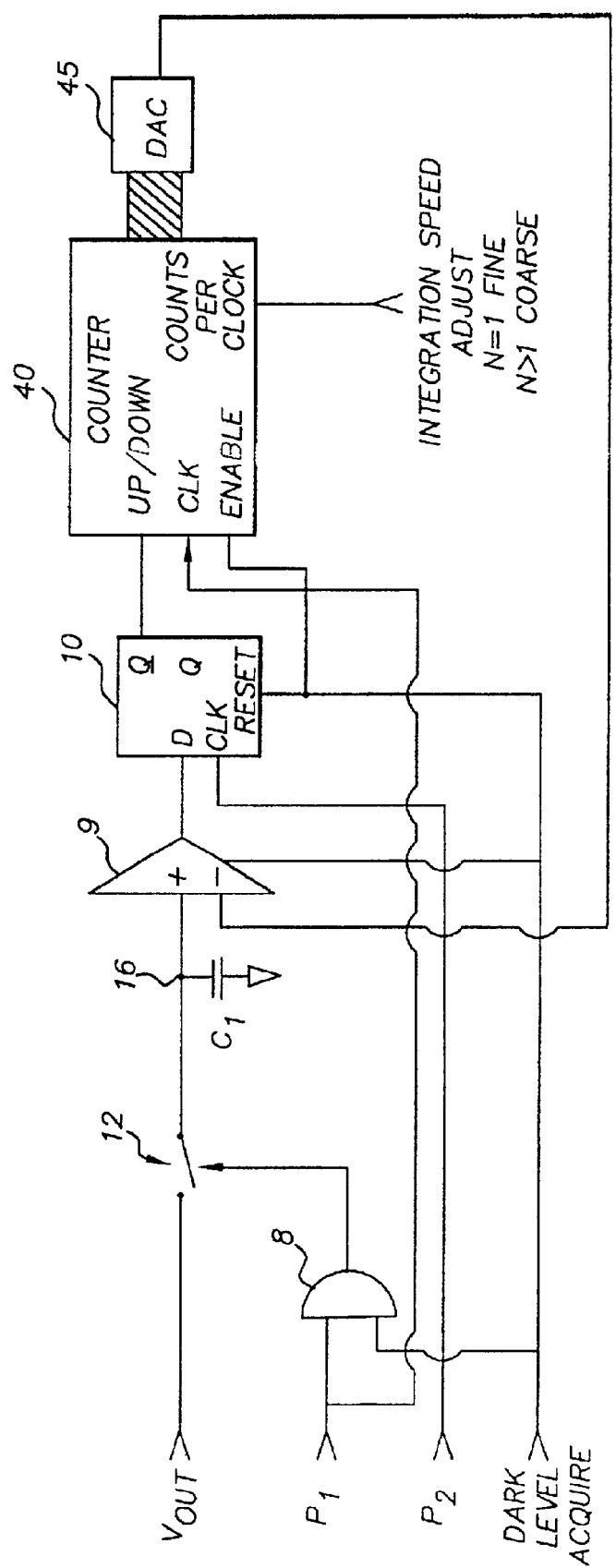
FIG. 3 is a schematic diagram of the digital implementation of the dark level acquisition circuitry of the present invention.

Referring to FIG. 3, there is shown a digital implementation of FIG. 1. The operation is substantially similar to FIG. 1 except that a counter 40 and digital-to-analog converter (DAC) 45 replaces $C_2$ and the current sources 25 and 30. The median dark level is stored on the counter 40 and converted to an analog signal by the DAC 45. If the pixel dark level stored on $C_1$ is lower than the cumulative median dark level, counter 40 is decremented, and if the pixel dark level is higher than the cumulative median, counter 40 is incremented.

The invention has been described in detail with particular reference to certain preferred embodiments thereof, but it will be understood that variations and modifications can be effected within the spirit and scope of the invention.

PARTS LIST 5 dark level acquire
6 AND gate
7 AND gate
8 AND gate
9 comparator
10 D flip flop
12 switch
15 switch
16 junction
25 current source
30 current source
35 fine/coarse adjustment
40 counter
45 DAC

What is claimed is:

1. A circuit for determining median dark level of an image sensor, the circuit comprising:

(a) a first circuit for comparing a current pixel value and a cumulative median;
   (b) a storage element for storing the cumulative median level; and
   (c) a second circuit which utilizes the first circuit for adjusting the cumulative median based on the current pixel level input for updating the cumulative median dark level.

2. The circuit as in claim 1, wherein the storage element is a capacitor.

3. The circuit as in claim 2, wherein the second circuit includes two current sources for adding or subtracting to the median dark level stored on the capacitor.

4. The circuit as in claim 3, wherein the two current sources can be adjusted to provide coarse control for rapid determination of an approximate median level, or to provide fine control for more accurate determination of the median dark level.

5. The circuit as in claim 3, wherein the second circuit includes logic circuitry for controlling the current sources.

6. The circuit as in claim 1, wherein the first circuit is a comparator.

7. The circuit as in claim 1, wherein the first circuit is either an operational amplifier or a linear circuit.

8. The circuit as in claim 1, wherein the storage element is a counter or another digital equivalent.

9. The circuit as in claim 8 wherein the second circuit includes a logic circuit for controlling the counter or the digital equivalent for increasing or decreasing the median dark level stored on the counter or the digital equivalent.

10. The circuit as in claim 8, wherein the counter or digital equivalent includes adjustable increments to provide coarse control for rapid determination of an approximate median level, or to provide fine control for more accurate determination of the median dark level.

* * * * *